(12) United States Patent
Matsuura et al.

(10) Patent No.: US 10,143,216 B2
(45) Date of Patent: Dec. 4, 2018

(54) COATED CONFECTIONERY

(71) Applicant: MEIJI CO., LTD., Tokyo (JP)

(72) Inventors: Tadashi Matsuura, Saitama-ken (JP); Maki Hiraoka, Saitama-ken (JP); Naoko Takai, Saitama-ken (JP); Hiroyuki Utsunomiya, Saitama-ken (JP)

(73) Assignee: MEIJI CO., LTD., Tokyo (JP)

( * ) Notice: Subject to any disclaimer, the term of this patent is extended or adjusted under 35 U.S.C. 154(b) by 1043 days.

(21) Appl. No.: 14/349,854

(22) PCT Filed: Oct. 5, 2012

(86) PCT No.: PCT/JP2012/075911
§ 371 (c)(1),
(2) Date: Apr. 4, 2014

(87) PCT Pub. No.: WO2013/051687
PCT Pub. Date: Apr. 11, 2013

(65) Prior Publication Data
US 2014/0234492 A1 Aug. 21, 2014

(30) Foreign Application Priority Data
Oct. 6, 2011 (JP) .................................. 2011-222287

(51) Int. Cl.
A23G 1/54 (2006.01)
A23G 3/54 (2006.01)

(52) U.S. Cl.
CPC ........ *A23G 3/54* (2013.01); *A23G 1/54* (2013.01)

(58) Field of Classification Search
CPC .................................... A23G 1/54; A23G 3/54
USPC .................................... 426/89, 103, 302, 307
See application file for complete search history.

(56) References Cited

U.S. PATENT DOCUMENTS

2004/0103821 A1  6/2004  Shobu et al.

FOREIGN PATENT DOCUMENTS

| JP | 6-133692 | 5/1994 |
|---|---|---|
| JP | 2000-210023 | 8/2000 |
| JP | 2009-291142 | 12/2009 |
| JP | 2009291142 A | * 12/2009 |
| JP | WO 2013031022 A1 | * 3/2013 ........... C09D 193/02 |

OTHER PUBLICATIONS

Toshihiro Nakayama, Characterization of Natural Resin Shellac by Reactive Pyrolysis-Gas Chromatography in the Presence of Organic Alkali, Anal. Chem. 1999, 71, 1316-1322.*
Office Action dated Feb. 25, 2016 in corresponding Taiwanese Patent Application No. 101136845, with English translation.
Huang et al., "Characteristic of Shellac and Its Application," Hangzhou Chemical Industry, No. 1, Mar. 2009, pp. 11-15, with English translation.
International Preliminary Report on Patentability dated Apr. 8, 2014 and English translation of Written Opinion of the International Searching Authority dated Dec. 25, 2012 in International (PCT) Application No. PCT/JP2012/075911.
Japanese Office Action dated Feb. 26, 2016, in corresponding Japanese Patent Application No. 2013-537569 (with English translation).
Office Action dated Mar. 30, 2018 in Malaysian Application No. PI 2014700802.
Office Action dated Jun. 4, 2018 in Philippine patent application No. 1-2014-500757.
International Search Report dated Dec. 25, 2012 in International (PCT) Application No. PCT/JP2012/075911.
A. N. Singh et al., "Chemistry of Lac Resin-VI Components of Soft Resin", Tetrahedron, vol. 30, No. 7, pp. 867-874, 1974.
H. Mizutani et al., "Shellac no Tokusei to sono Yoto -Tayosei o Yusuru Furukute Michinaru Tennen Sozai-", Convertech, vol. 30, No. 11, pp. 41-45, 2002 (In Japanese).
Nigami o Kanjinai Shellac, Mar. 31, 2012, [online] (retrieved on Dec. 18, 2012), URL:https://www.gifushellac.co.jp/wp-content/uploads/2012/04/2012.031.pdf (In Japanese).

* cited by examiner

*Primary Examiner* — Jyoti Chawla
(74) *Attorney, Agent, or Firm* — Wenderoth, Lind & Ponack, L.L.P.

(57) ABSTRACT

The present invention relates to a coated confection in which the wear resistance and shape retention property in high temperature of the center thereof are improved by coating a sufficient amount of shellac on a center with a complex shape. More particularly, the present invention relates to a coated confection composed of a center composed of an oil-based confection and shellac coating the center, wherein a coating rate of shellac is 0.1 to 10%.

11 Claims, No Drawings

COATED CONFECTIONERY

CROSS REFERENCE TO RELATED APPLICATIONS

The present application claims priority based on Japan Patent Application 2011-222287, filed on Oct. 6, 2011. The entire disclosure of such prior patent application is thus incorporated herein by reference.

TECHNICAL FIELD

The present invention relates to a coated confection that is coated with shellac, which coated confection has wear resistance or shape retention property in high temperature, and a method of producing the coated confection.

BACKGROUND ART

Conventionally, commercial products whose surface is coated with shellac have been known.

The heat resistance, strength, and gloss of the coating greatly benefit prevention of the product from melting when held in hand, prevention of the surface from being scrapped because of products chafing against each other, improvement of product quality such as outer appearance thereof, or the like.

In general, employed is a method in which a revolving pan is utilized, which method comprises pouring a shellac solution while chocolate with a substantially spherical shape and less irregularities or the like is rotated in a revolving pan and drying the resultant to form a thin layer on the surface of chocolate.

Further, as a method of coating with shellac, a method of immersing chocolate or the like in a tank filled with a shellac solution has been disclosed (Patent Document 1). However, conventional shellac has a strong bitter taste and thus is easy to adversely affect the taste of chocolate. Because of this, an amount of coating tended to be lowered as much as possible in such a way that the influence on the taste of the product decreased.

Further, what may be conventionally employed is a method of coating in advance the surface of an oil-based confection with glucose syrup, sugar solution, or the like before the surface of the oil-based confection is coated with shellac. This is an effective means to impart gloss to the surface of the oil-based confection. Yet, when the coating with the sugar solution was not for some reason carried out in advance, a more amount of shellac was required for the coating in order to impart comparable gloss; and thus the bitter taste of shellac excessively stood out when conventional shellac was used, resulting in failure to produce one suitable as a product.

Meanwhile, the shape of chocolate products nowadays comes to diverse in associated with diversification of individual's preferred taste. The available are, for example, a confection with oil-based coating whose surface has a large number of projections and a chocolate confection whose surface exhibits marked irregularities such as chocolate with relief, which are described in Patent Document 2.

PRIOR ART REFERENCES

Patent Documents

Patent Document 1: Japanese Patent Application Laid-Open Publication No. Hei 06-133692

Patent Document 2: Japanese Patent Application Laid-Open Publication No. 2000-210023

SUMMARY OF THE INVENTION

When an attempt is made to coat chocolates having marked irregularities or the like with shellac using a usual revolving pan by a usual method, projecting portions excessively run into each other and it is thus difficult to sufficiently coat such portions with the shellac coating.

This causes problems of scraping projecting portions due to wear during distribution or the like, and of failure to impart shape retention property in high temperature at the time of high temperatures. Further, due to restriction in the blend composition and Preparation process of chocolates or the like, the surface of product may unintentionally come to be a fine rough surface and a conventional amount of coating shellac has failed to bring about satisfactory gloss to the surface of product.

In view of this, the present inventors intensively studied to complete the following inventions.

(1) A coated confection composed of a center composed of an oil-based confection and shellac coating the center, wherein a coating rate of said shellac is 0.1 to 10% by weight.

(2) The coated confection according to (1), wherein said center has at least one projecting portion or recessed portion.

(3) The coated confection according to (1) or (2), wherein said shellac used is less bitter shellac.

(4) The coated confection according to any one of (1) to (3), wherein the shellac comprises 4.0% by weight or less jalaric acid 5-aleuritate on a dry weight basis.

(5) The coated confection according to any one of (1) to (4), wherein a coating rate of said shellac is 0.3 to 5% by weight.

(6) The coated confection according to any one of (1) to (5), wherein a coating rate of said shellac is 0.5 to 3% by weight.

(7) The coated confection according to any one of (1) to (6), wherein a height of said projecting portion or the depth of said recessed portion is 0.3 to 5 mm.

(8) The coated confection according to any one of (1) to (7), wherein the oil-based confection does not contain sugar or glucose syrup.

(9) The complex confection according to any one of (1) to (8), wherein a method of coating said shellac comprises immersing said oil-based confection that serves as the center in a shellac solution.

(10) A method of producing a coated confection comprising coating an oil-based confection including at least one projecting portion or recessed portion with shellac so that a coating rate of said shellac is 0.1 to 10%.

(11) The method of production according to (10), wherein the shellac comprises 4.0% by weight or less jalaric acid 5-aleuritate on a dry weight basis.

(12) The method of production according to (10) or (11), wherein the coating is carried out by immersing the above oil-based confection in a shellac solution.

(13) The coated confection according to any one of (10) to (12), wherein the height of the projecting portion or the depth of the recessed portion in the oil-based confection is 0.3 to 5 mm.

(14) The coated confection according to any one of (10) to (13), wherein the oil-based confection does not contain sugar or glucose syrup.

According to the present invention, by coating the whole of a center with a shape having irregularities including projecting portions with a sufficient amount of shellac at a coating rate between 0.1 and 10%, the wear resistance or shape retention property in high temperature of the center can be improved as the first effect. Further, the above first effect can be exerted by using shellac with reduced content of jalaric acid 5-aleuritate without causing deterioration of the quality ascribed to the bitter taste of the shellac. In addition, according to the present invention, even when sugar or glucose syrup is not used in the raw material of an oil-based confection or the coating, use of a small amount of shellac with reduced content of jalaric acid 5-aleuritate shows advantages in attaining pronounced gloss and retaining flavors intrinsic to the confection.

MODE FOR CARRYING OUT THE INVENTION

As mentioned above, the present invention is a coated confection comprising, in the order mentioned, a coating layer and a center (a core) from the surface side, wherein the coating layer contains shellac and the center contains an oil-based confection. One of the characteristics thereof is that a coating rate of shellac is 0.1 to 10% by weight. In cases where less bitter shellac described later is used, such a coated confection is in particularly advantageous from the viewpoint of improving the wear resistance or shape retention property in high temperature in the oil-based confection and, at the same time, retaining the flavor intrinsic to the oil-based confection.

The present invention will be described in detail below.

In the present invention, an oil-based confection used in a center is preferably a confection that contains fat and/or oil. More preferably, it may be a complex confection whose surface is at least partially coated with fat and/or oil (temper type or non-temper type). Specifically, the oil-based confection of the present invention may be any chocolate including white chocolate, milk chocolate, and sweet chocolate. In addition, the oil-based confection of the present invention is not limited to chocolate and quasi chocolates or jun-chocolates which are defined in the Fair Competition Codes concerning Labeling on Chocolates; and all sorts of oil-based confections including a temper type or non-temper type fat cream which does not fall under those codes are applicable to the oil-based confection of the present invention. According to one embodiment of the present invention, the oil-based confection is preferably a confection that contains chocolate. Examples of such a confection that contains chocolate include chocolate confections obtained by subjecting chocolate dough to processing such as tempering, and complex confections whose surface is at least partially coated with chocolate (such as fried potatoes or biscuits coated with chocolate).

The present invention is more effective when the center has irregularities. It need only have at least one projecting portion or recessed portion. The present invention is still more effective when there are plural irregularities. The center having irregularities may take on any shape. For instance, the center may take on a shape of sphere, oblate spheroid, or prolate spheroid whose surface has konpeito-like projections or mulberry-like recessed portions, which konpeito is small ball-shaped candy with horn-like prongs on the surface made from sugar, porous materials like sponge, a shape having a groove-like recessed portion like coffee beans, a shape of corrugated sheet, a plate-like shape having characters, patterns, or designs, or a combination thereof, wherein one surface or both surfaces of a center has irregularities like relief.

In addition, the center may contain, besides the above oil-based confection, solid edible substances. Examples thereof include biscuits, cookies, puffed cereals, nuts, freeze-dried fruits, potato chips, and confections made from rice such as Japanese rice crackers. Containment of these solid edible substances may allow the shape of the center to have more complex irregularities, and thereby the present invention becomes still more effective.

Therefore, according to one preferred embodiment, the oil-based confection is at least one selected from the group consisting of: chocolates, fat cream, biscuits, cookies, puffed cereals, nuts, freeze-dried fruits, potato chips, and rice confections made from rice; and a combination thereof.

The height or depth of the irregularities of the center oil-based confection is not particularly restricted; and the center oil-based confection preferably has a height or depth of not less than 0.3 mm and not more than 5 mm. In addition, the height or depth of the irregularities is further preferably not less than 0.3 mm and not more than 3 mm, further preferably not less than 0.5 mm and not more than 3 mm, and even further preferably not less than 0.7 mm and not more than 3 mm.

Further, according to one embodiment of the present invention, it is preferred to produce the oil-based confection without including sugar or glucose syrup. Further, use of less bitter shellac described later is in particular advantageous from the viewpoint of imparting gloss concurrently with retaining the flavor intrinsic to a food product without using sugar or the like. It is also preferred that no sugar or glucose syrup be used in the production of the oil-based confection from the viewpoint of reducing the cost or simplifying the production step.

In the present invention, shellac refers to one obtained by purifying a resinous substance secreted by the lac insect *Laccifer lacca*. The shellac may be a natural product or may be a commercially available product; and it is in particular preferred to use a shellac with reduced content of jalaric acid 5-aleuritate from the viewpoint of decreasing the bitter taste of the shellac.

According to a preferred embodiment of the present invention, the content of jalaric acid 5-aleuritate in shellac is, on a dry weight basis, based on the whole of the shellac, preferably not more than 4.0% by weight and more preferably not more than 2.5% by weight. The term "less bitter shellac" in the present specification refers hereby to a shellac with 4.0% by weight or less jalaric acid 5-aleuritate in the solid content on a dry weight basis.

The amount of jalaric acid 5-aleuritate in the shellac can be readily adjusted by a method described in the Exemplary Preparation Method 2 described below and the like.

The coated confection of the present invention can be obtained by applying shellac as described above to the oil-based confection at a coating rate of shellac of 0.1 to 10%. Here, a coating rate of shellac means one expressing the dry weight of shellac based on the whole coated confection by the terms of percentage. Therefore, a coating rate of shellac may be one expressing, by the terms of percentage, the weight of non-volatile components of shellac that accounts for the whole product when the center is coated with a shellac solution, for example, by a conventional method and thereafter sufficiently dried to remove ethanol or water which is a solvent.

A coating rate of shellac varies in the size of center, the number and size of irregularities, the fine surface condition ascribed to difference in a method of molding a center; and is preferably not less than 0.1% by weight, more preferably not less than 0.2% by weight, still more preferably not less than 0.3% by weight, and still more preferably not less than 0.5% by weight. It is advantageous that a coating rate of shellac is higher than 0.1% by weight from the viewpoint of coating the entire surface of the center with a sufficient amount of shellac.

Further, a coating rate of shellac is preferably not more than 10% by weight, more preferably not more than 5% by weight, and still more preferably not more than 3% by weight. It is advantageous that a coating rate of shellac is lower than 10% from the viewpoint of preventing the texture intrinsic to a product from being impaired by the hard texture of the shellac coating.

The method of producing the coated confection of the present invention is not particularly restricted; and, for instance, the production can be achieved by a method comprising applying an oil-based confection in a shellac solution by using a known coating device or a method comprising immersing an oil-based confection in a shellac solution.

The shellac solution of the present invention is not particularly restricted as long as it contains shellac; and preferably an ethanol solution or aqueous solution of shellac, with an ethanol solution being more preferred.

The concentration of shellac solution used is not particularly restricted and preferably not less than 5% by weight and not more than 40% by weight. Here, the concentration of shellac solution used refers to the weight of shellac non-volatile component that accounts for the whole shellac solution. It is advantageous to set the concentration of the solution to 5% by weight or higher from the viewpoint of securing a sufficient amount of coating shellac, avoiding repeating the coating and solvent volatilization many times, preventing unnecessary contact of ethanol with center chocolates or the like, and furthermore preventing change in quality of the chocolate or the like or blooming thereof. Further, it is advantageous to set the concentration of the solution to 40% by weight or lower from the viewpoint of keeping the viscosity of the solution low and coating uniformly on the surface of product; and is preferred in particular for products with marked irregularities from the viewpoint of sufficiently spreading the shellac solution all over the recessed portions.

In addition, the concentration of shellac solution is more preferably not less than 5% by weight and not more than 30% by weight and still more preferably not less than 20% by weight and not more than 30% by weight.

In the step of applying a shellac solution to an oil-based confection, a known coating device such as a revolving pan may be utilized. Such a coating condition is not particularly restricted and the condition may be adjusted as appropriate according to the shape and properties of the oil-based confection, the concentration of shellac solution, or the like. Such a coating condition may be, for example, 20 to 30° C. for 5 to 30 rpm.

Further, in cases where the shape of a center (an oil-based confection) has complex irregularities, shellac cannot coat over the whole surface of the center by means of a conventional revolving pan, and the center hit each other in the revolving pan to be damaged; or in cases where the center is in a rod-like shape, plate-like shape or the like and is easy to stick to each other when an attempt is made to coat shellac using the revolving pan, it is preferred to employ a method of coating that comprises immersing the center in a tank filled with a shellac solution.

Specific conditions for such a method of immersion are not particularly restricted and, for instance, the oil-based confection may be immersed in the shellac solution for 0.5 to 30 seconds.

In addition, after immersed, the coated confection is preferably dried. Drying conditions are not particularly restricted and a conventional method may be employed. The drying may be carried out, for example, by applying air with a temperature of 15 to 40° C.

EXAMPLES

The present invention will be illustrated further by the following Examples but the scope of the present invention is not limited by these Examples. Unless otherwise dictated, "%" below represents "% by weight".

Exemplary Preparation Methods

Preparation of Oil-Based Confectionery

Twenty parts by weight of cacao mass, 50 parts by weight of sugar, 20 parts by weight of whole milk powder, 10 parts by weight of cocoa butter, and 0.5 parts by weight of lecithin were blended with a mixer and then ground with a roll chocolate refiner according to a conventional method of producing chocolate confectionery, thereby obtaining chocolate powder.

Spherical puffed wheat grains, each of which was 10 mm in diameter and 0.2 g in weight, were added to a revolving pan and then the above-described chocolate powder was gradually added to the revolving pan while the pan rotated at 12 rpm at 24° C. The surface of the puffed wheat grains was coated with the chocolate powder such that the weight of the product was 0.45 g per grain.

Each of the obtained chocolate complex confections had projections as seen in Konpeito sugar candy, which projections consisted of chocolate and had an average height of 0.7 mm.

Preparation of Less Bitter Shellac

Ten grams of Purified Shellac GSN (produced by Gifu Shellac Manufacturing Co., Ltd.) was mixed with 100 mL of ethyl acetate and the mixture was refluxed for 30 min while stirring, and then cooled down to room temperature. The mixture was allowed to stand for one hour before the supernatant was separated by decantation. The remaining precipitate was mixed again with 100 mL of ethyl acetate and the mixture was refluxed for 30 min while stirring. After cooled down to room temperature, the mixture was allowed to stand for one hour and the supernatant was separated by decantation.

The obtained supernatants were combined and concentrated and then dried under vacuum, thereby obtaining 3.7 g of a fraction (Fr. 1). Also, the precipitate was concentrated under vacuum and then dried under vacuum, thereby obtaining 6.2 g of a fraction (Fr. 2). Fr. 1 was dissolved in as small a volume of methanol as possible and loaded to a column packed with 300 mL of COSMOSIL 75C18-OPN (Product name, produced by Nacalai Tesque, Inc.) and then eluted with a solvent consisting of methanol and water (methanol:water=4:1). The eluate was concentrated under vacuum and then dried under vacuum, thereby obtaining 1.3 g of a fraction (Fr. 3). Subsequently, the column was subjected to elution using methanol and the obtained eluate was concentrated under vacuum and then dried under vacuum, thereby obtaining 2.4 g of a fraction (Fr. 4).

Fr. 2 and Fr. 4 were mixed together and thereby less bitter shellac (referred to as Shellac A for convenience) was produced.

Shellac A was dissolved in ethanol to produce a solution in 100 mg/mL. This solution is referred to as Solution B for convenience. The content of jalaric acid 5-aleuritate in Shellac A was determined by using a LC/MS-MS system and found to be 1.74% by weight.

Evaluation of Bitter Taste

The above-described Solution B (1 mL) was mixed with 99 mL of 4% (vol/vol) ethanol to produce 1 mg/mL Shellac A solution in 5% (vol/vol) ethanol. This solution is referred to as Solution C for convenience. Isolated jalaric acid 5-aleuritate was added to Solution C to produce a series of solutions, which had a jalaric acid 5-aleuritate content of 2.00% by weight, 2.25% by weight, 2.50% by weight, 2.75% by weight, 2.75% by weight, or 3.00% by weight. The term "content", as used herein, does not represent a content of jalaric acid 5-aleuritate relative to a solution of shellac but a content of jalaric acid 5-aleuritate relative to the shellac itself included in the solution.

Testers dropped 0.1 mL each of the produced test solutions on their tongue and explored the threshold concentration. The testers (examiners) were consisted of seven women in their twenties and seven men in their twenties to thirties.

When the content of jalaric acid 5-aleuritate in the shellac was 2.5% by weight, the shellac was found to have a sufficiently reduced bitter taste. Moreover, reduction in bitter taste was found to be more significant when the content thereof was 2.0% by weight.

Exemplary Product #1

The chocolate complex confections, which had been obtained in the Exemplary Preparation Method 1, were added to another revolving pan and then a 25% solution of the less bitter shellac in ethanol was added while the pan rotated at 12 rpm at 24° C. and the solvent, ethanol, was evaporated. Addition of the shellac was not ended until the coating rate of the shellac reached to 1.0%, thereby obtaining a chocolate complex confection coated with the less bitter shellac.

The obtained chocolate complex confection coated with the less bitter shellac had a glossy surface, which was wholly coated with a sufficient amount of the less bitter shellac and showed no exposed chocolate coat, thus seeming to be in very good condition.

When the above-described coated chocolate complex confection was held by fingers for a while, the fingers were not smeared with melted chocolate, and thus the confection seemed to be in very good condition.

Exemplary Product #2

A shellac-coated chocolate complex confection, in which a coating rate of the less bitter shellac was 0.5%, was obtained in a similar method to the Exemplary Product #1, except that the coated amount of the less bitter shellac was 0.5%.

The obtained chocolate complex confection coated with the less bitter shellac had a less glossy surface, which was wholly coated with a sufficient amount of the less bitter shellac and showed no exposed chocolate coat, thus seeming to be in very good condition.

When the above-described coated chocolate complex confection was held by fingers for a while, the fingers were not smeared with melted chocolate, and thus the confection seemed to be in very good condition.

Exemplary Product #3

A shellac-coated chocolate complex confection, in which a coating rate of the less bitter shellac was 0.3%, was obtained in a similar method to the Exemplary Product #1, except that the coated amount of the less bitter shellac was 0.3%.

The obtained chocolate complex confection coated with the less bitter shellac had a surface with no gloss, which was wholly coated with the less bitter shellac and showed no exposed chocolate coat, thus seeming to be in good condition.

When the above-described coated chocolate complex confection was held by fingers for a while, the fingers were rarely smeared with melted chocolate, and thus the confection seemed to be in good condition.

Exemplary Product #4

A shellac-coated chocolate complex confection, in which a coating rate of the less bitter shellac was 0.1%, was obtained in a similar method to the Exemplary Product #1, except that the coated amount of the less bitter shellac was 0.1%.

The obtained chocolate complex confection coated with the less bitter shellac had a surface, on which some recessed portions were not coated with the shellac, still seeming to be in rather good condition.

When the above-described coated chocolate complex confection was held by fingers for a while, the fingers were rarely smeared with melted chocolate, and thus the confection seemed to be in rather good condition.

Exemplary Product #5

A shellac-coated chocolate complex confection, in which a coating rate of shellac was 0.5%, was obtained in the same method as for the Exemplary Product #2, except that the added shellac solution in ethanol was a conventional product (Product name: Purified Shellac GSN, produced by Gifu Shellac Manufacturing Co., Ltd.).

The obtained shellac-coated chocolate complex confection had a less glossy surface, which was wholly coated with a sufficient amount of the shellac and showed no exposed chocolate coat, thus seeming to be in good condition.

When the above-described coated chocolate complex confection was held by fingers for a while, the fingers were not smeared with melted chocolate, and thus the confection seemed to be in very good condition.

Exemplary Product #6

A shellac-coated chocolate complex confection, in which a coating rate of shellac was 0.3%, was obtained in the same method as for the Exemplary Product #3, except that the added shellac solution in ethanol was a conventional product (Product name: Purified Shellac GSN, produced by Gifu Shellac Manufacturing Co., Ltd.).

The obtained chocolate complex confection coated with the shellac had a surface with no gloss, which was wholly coated with the shellac and showed no exposed chocolate coat, thus seeming to be in rather good condition.

Exemplary Product #7

A shellac-coated chocolate complex confection, in which a coating rate of shellac was 0.1%, was obtained in the same method as for the Exemplary Product #4, except that the added shellac solution in ethanol was a conventional product (Product name: Purified Shellac GSN, produced by Gifu Shellac Manufacturing Co., Ltd.).

The obtained shellac-coated chocolate complex confection had a surface, on which some recessed portions were not coated with the shellac, still seeming to be in rather good condition.

When the above-described coated chocolate complex confection was held by fingers for a while, the fingers were rarely smeared with melted chocolate, and thus the confection seemed to be in rather good condition.

Comparative Example 1

A shellac-coated chocolate complex confection, in which a coating rate of shellac was 0.05%, was obtained in the same method as for the Exemplary Product #4, except that the added shellac solution in ethanol was a conventional product (Product name: Purified Shellac GSN, produced by Gifu Shellac Manufacturing Co., Ltd.).

The obtained shellac-coated chocolate complex confection had a surface, on which even some projecting portions were not coated, thus seeming to be in poor condition.

When the above-described coated chocolate complex confection was held by fingers for a while, the fingers were smeared with melted chocolate, and thus the confection seemed to be in poor condition.

Wear Resistance and Shape Retention Property in High Temperature

As described above, while each of the Exemplary Products #1 to 7 (at a coating rate of 0.1 to 1.0% by weight) was held by fingers, chocolate in the products was not melted and the melted chocolate did not smear the fingers, and therefore the wear resistance and the shape retention property in high temperature in the products were acknowledged. On the other hand, while the product in Comparative Example 1 (at a coating rate of 0.05) was held by fingers, chocolate in the product was melted and the melted chocolate smeared the fingers, and therefore the shape retention property in high temperature in the product was not acknowledged.

Exemplary Test 1

Sensory Test

A Sensory test was applied to evaluate the Exemplary Products #1 to 7 and the shellac-coated chocolate complex confection obtained in Comparative Example 1 by using a five grade rating system, in which a rating of 1 was the worst and a rating of 5 was the best.

The products using the less bitter shellac in the Exemplary Products #1 to 4 were less influenced by the bitter taste of shellac, so that the products generally got a high rating.

In the products using the conventional shellac product in the Exemplary Products #5 to 7 and Comparative Example 1, as a coating rate of shellac was increased, a stronger bitter taste was felt and the flavors of chocolate and puffed wheat grain were reduced, so that the products got a lower rating.

TABLE 1

| Sample | Type of shellac | Coating rate | Sensory rating |
|---|---|---|---|
| Exemplary Product #1 | Less bitter shellac | 1.0 | 3.1 |
| Exemplary Product #2 | Less bitter shellac | 0.5 | 3.6 |
| Exemplary Product #3 | Less bitter shellac | 0.3 | 4.0 |
| Exemplary Product #4 | Less bitter shellac | 0.1 | 4.7 |
| Exemplary Product #5 | Purified Shellac GSN | 0.5 | 1.9 |
| Exemplary Product #6 | Purified Shellac GSN | 0.3 | 2.8 |
| Exemplary Product #7 | Purified Shellac GSN | 0.1 | 3.9 |
| Comparative Example 1 | Purified shellac GSN | 0.05 | 4.4 |

Over-All Judgment Based on Wear Resistance, Shape Retention Property in High Temperature, and Sensory Test Based on the above-described results of the experiments, each of wear resistance, shape retention property in high temperature, and sensory rating was satisfactory in the chocolate confections having uneven surface in the Exemplary Products #1 to 4 using the less bitter shellac (at a coating rate of 0.1 to 1.0% by weight).

Especially, the Exemplary Products #1 to 3 (using the less bitter shellac: at a coating rate of 0.3 to 1.0% by weight) had a greatly higher rating compared to those of the Exemplary Products #5 and 6 (using Purified Shellac GSN: at a coating rate of 0.3 to 0.5% by weight). This is indicated by the comparisons between the Exemplary Product #2 (rating: 3.6) and the Exemplary Product #5 (rating: 1.9) and between the Exemplary Product #3 (rating: 4.0) and the Exemplary Product #6 (rating: 2.8), in which those pairs had the same level of coating rate, respectively.

From the above result, a chocolate complex confection coated with the less bitter shellac at a coating rate of 0.3% or more was found to have a reduced bitter taste, even though a high dose of shellac was used therein, and to retain a good texture and appearance without the taste of the food products being compromised.

Exemplary Product #8

A tabular chocolate confection (Product name: meiji milk chocolate, manufactured by Meiji, Co., Ltd.), which is 78 mm in length, 160 mm in width, 7 mm in height and 58 g in weight and has recessed portions at 3 mm in depth on the upper surface and a groove-like recess of a logotype (at 0.3 mm in depth) on each of the recessed portions, was dipped into a tub filled with a 25% solution of the less bitter shellac in ethanol for one second, pulled up, deprived of the excess shellac solution from the recessed portions, and dried thoroughly with cold air at 20° C., thereby obtaining a tabular chocolate confection coated with the less bitter shellac.

The coating rate of the shellac was 0.6% in the obtained tabular chocolate confection coated with the less bitter shellac. The product was wholly coated in a uniform manner with the less bitter shellac. When the chocolate confection was held by fingers for a while, the fingers were not smeared with melted chocolate, and thus the confection seemed to be in good condition.

When the obtained tabular chocolate confection coated with the less bitter shellac was eaten, it had a flavor inherent to chocolate, thus seeming to be in good condition.

Exemplary Product #9

A shellac-coated tabular chocolate confection was obtained in the same method as for the Exemplary Product #3, except that the used shellac was a conventional product (Product name: Purified Shellac GSN, Gifu Shellac Manufacturing Co., Ltd.).

The coating rate of the shellac was 0.6% in the obtained shellac-coated tabular chocolate confection.

The product was wholly coated in a uniform manner with the shellac. When the chocolate confection was held by fingers for a while, the fingers were not smeared with melted chocolate, and thus the confection seemed to be in good condition.

When the obtained tabular chocolate confection coated with the shellac was eaten, it was bitterer than the Exemplary Product #8 and had a reduced flavor of chocolate.

The Exemplary Products #8 and 9 using a chocolate with uneven surface (at a coating rate of 0.6% by weight) had satisfactory wear resistance and shape retention property in high temperature. A chocolate confection having uneven surface, which was coated with the less bitter shellac at a coating rate of 0.6% or more, was found to have a reduced bitter taste, even though a high dose of shellac was used therein, and to retain the flavor of chocolate.

Exemplary Product #10

Cookie Balls Using No Sugar

Fifteen parts by weight of shortening, 15 parts by weight of maltitol, 8 parts by weight of powdered skim milk, 60 parts by weight of wheat flour, 1 part by weight of baking powder, and 1 part by weight of flavors were added to a mixer bowl and mixed by stirring, followed by shaping the mixture into a spherical form. The obtained spherical bodies were baked using an oven at 180° C. for 10 min, and thereby cookie balls using no sugar, which was 1 g/ball in weight, were obtained.

Twenty parts by weight of cacao mass, 20 parts by weight of whole milk powder, 40 parts by weight of maltitol, 20 parts by weight of cocoa butter, 0.8 parts by weight of lecithin, and 0.1 parts by weight of flavors were used according to a conventional method of producing chocolate confectionery, to obtain a chocolate dough using no sugar.

The obtained cookie balls using no sugar were added to a revolving pan and then the above-described chocolate dough using no sugar was gradually added to the revolving pan while the pan rotated at 12 rpm at 24° C. The surface of the cookie balls using no sugar was coated with the chocolate dough using no sugar such that the weight of the product was 2.5 g per ball, thereby obtaining a chocolate complex confection.

The obtained chocolate dough was added to a revolving pan and then a 30% solution of the less bitter shellac in ethanol was added while the pot rotated at 12 rpm at 24° C. and the solvent, ethanol, was evaporated. Addition of the shellac was not ended until the coating rate of the shellac reached to 0.2%, thereby obtaining a chocolate complex confection coated with the less bitter shellac.

The obtained chocolate complex confection coated with the less bitter shellac had a glossy surface, which was wholly coated with a sufficient amount of the less bitter shellac and showed no exposed chocolate coat, thus seeming to be in very good condition.

When the above-described chocolate complex confection coated with the less bitter shellac was held by fingers for a while, the fingers were not smeared with melted chocolate, and thus the confection seemed to be in very good condition. Furthermore, the chocolate complex confection coated with the less bitter shellac had no bitter taste inherent to shellac and got an evaluation from panelists, which claimed that the confection was tasty.

Exemplary Product #11
Cookie Balls Using No Sugar

The chocolate complex confections, which had been obtained during the course of producing the Exemplary Product #10, were added to another revolving pan and then an ethanol solution of a conventional shellac product (Product name: Purified Shellac GSN, produced by Gifu Shellac Manufacturing Co., Ltd.) was added while the pot rotated at 12 rpm at 24° C. and the solvent, ethanol, was evaporated. Addition of the shellac was not ended until the coating rate of the shellac reached to 0.2%, thereby obtaining a shellac-coated chocolate complex confection using no sugar.

The obtained shellac-coated chocolate complex confection using no sugar had a glossy surface, which was wholly coated with a sufficient amount of the shellac and showed no exposed chocolate coat, thus seeming to be in very good condition.

Furthermore, when the shellac-coated chocolate complex confection using no sugar was held by fingers for a while, the fingers were not smeared with melted chocolate, and thus the confection seemed to be in very good condition.

However, when the above-described shellac-coated chocolate complex confection using no sugar was eaten, it had a stronger bitter taste unique to shellac compared to the chocolate complex confection using no sugar and coated with the less bitter shellac of the above-described Exemplary Product #10, and had compromised tastes of chocolate and cookie.

Exemplary Product #12
Cookie Balls Using No Sugar

Forty parts by weight of sugar and 60 parts by weight of glucose syrup having a water content of 25% were mixed to dissolve the sugar by stirring, thereby obtaining a glaze.

The chocolate complex confections, which had been obtained during the course of producing the Exemplary Product #10, were added to another revolving pan and then the above-described glaze was added while the pot rotated at 12 rpm at 24° C. and the solvent, water, was evaporated and dried. Addition of the glaze was not ended until the coating rate of the glaze reached to 0.1%. An ethanol solution of a conventional shellac product (Product name: Purified Shellac GSN, produced by Gifu Shellac Manufacturing Co., Ltd.) was further added while the solvent, ethanol, was evaporated. Addition of the shellac was not ended until the coating rate of the shellac reached to 0.1%. A shellac-coated chocolate complex confection using sugar was obtained in the end.

When the above-described chocolate complex confection using sugar and coated with the less bitter shellac was held by fingers for a while, the fingers were not smeared with melted chocolate, and thus the confection seemed to be in very good condition. Furthermore, the chocolate complex confection coated with the less bitter shellac had no bitter taste inherent to shellac and it was tasty.

However, the above-described chocolate complex confection of this example was coated with the glaze using sugar according to a conventional method, so that the confection would not regarded as a no sugar-added confection.

What is claimed is:

1. A coated confection comprising:
   a center comprising an oil-based confection, and
   a layer comprising shellac which coats the center,
   wherein a coating rate of said shellac is 0.1 to 10% by weight, and
   wherein said shellac comprises 4.0% by weight or less jalaric acid 5-aleuritate on a dry weight basis.

2. The coated confection according to claim 1, wherein said center has at least one projecting portion or recessed portion.

3. The coated confection according to claim 2, wherein a height of said projecting portion or a depth of said recessed portion is 0.3 to 5 mm.

4. The coated confection according to claim 1, wherein said shellac comprises 2.5% by weight or less jalaric acid 5-aleuritate on a dry weight basis.

5. The coated confection according to claim 4, wherein a coating rate of said shellac is 0.1 to 1.0% by weight.

6. The coated confection according to claim 1, wherein a coating rate of said shellac is 0.3 to 5% by weight.

7. The coated confection according to claim 1, wherein a coating rate of said shellac is 0.5 to 3% by weight.

8. The coated confection according to claim 1, wherein said center does not contain sugar or glucose syrup.

9. The coated confection according to claim 1, wherein a method of coating with said layer comprising shellac comprises immersing said center in a shellac solution.

10. The coated confection according to claim 1, wherein a coating rate of said shellac is 0.1 to 1.0% by weight.

11. A coated confection consisting of:
    a center comprising an oil-based confection, and
    a shellac coating the center, wherein a coating rate of said shellac is 0.1 to 10% by weight, and wherein said shellac comprises 4.0% by weight or less jalaric acid 5-aleuritate on a dry weight basis.

* * * * *